H. VAN AUSDALL.
APPARATUS FOR KINDLING FIRES.
No. 67,382. Patented July 30, 1867.
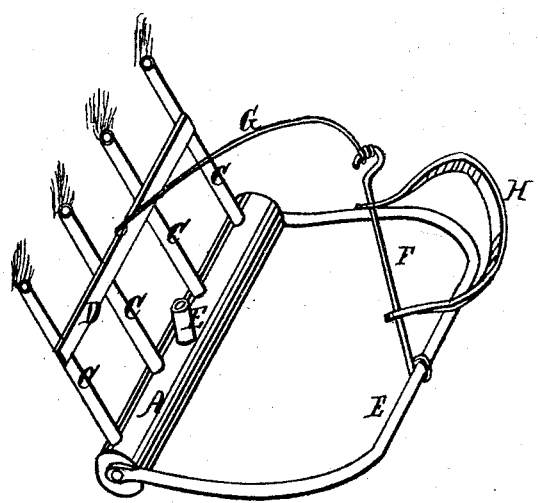
Witnesses
Theo Tusche
Wm Trewin
Inventor
Henry Van Ausdall
Per [signature]
Attorneys

United States Patent Office.

HENRY VAN AUSDALL, OF KEOKUK, IOWA.

Letters Patent No. 67,882, dated July 30, 1867

APPARATUS FOR KINDLING FIRE.

*The Schedule referred to in these Letters Patent and making part of the same.*

TO ALL WHOM IT MAY CONCERN:

Be it known that I, HENRY VAN AUSDALL, of Keokuk, in the county of Lee, and State of Iowa, have invented a new and useful improvement in Fire-Kindler; and I do hereby declare that the following is a full, clear, and exact description thereof, which will enable others skilled in the art to make and use the same, reference being had to the accompanying drawings, forming part of this specification.

The object of this invention is to facilitate the making of fires in stoves and fire-places, or wherever it is desired to kindle a fire; and the invention consists in constructing an apparatus whereby oil, alcohol, or any of the hydrocarbons may be used for the purpose of igniting coal or wood.

The drawing represents a perspective view of the fire-kindler.

A is a hollow cylinder closed at each end, which contains the oil or other fluid. B represents a tube by which the cylinder A is supplied. C represents tubes which communicate with the interior of A. Each of these tubes has a wick like the wick of a lamp. D is a cross-piece attached to the tubes C. E is a bail which is attached to the ends of the cylinder A by pivots which pass through holes in the ends of the bail and screw into the ends of the cylinder, and upon which the bail freely turns. F is a wire rod which is attached to the bail by an eye which allows it to turn on the bail. G is wire, one end of which is attached to the rod F, and the other end to the cross-piece D. Both of these connections form joints, so that when the bail E is placed in a horizontal position or lies flat upon the hearth, the tubes C are supported in any desired position by the rod F and the wire G. H is a handle which is attached to the rod F. When it is desired to burn gas, instead of any of the hydrocarbon oils or other burning-fluid, an elastic tube or conductor may be attached to tube B.

To kindle a fire the wicks or the gas is lighted when the kindler is adjusted under the coal or other fuel in any desired position.

What I claim as new, and desire to secure by Letters Patent, is—

The portable fire-kindler, constructed as described, consisting of the hollow metallic cylinder A, closed at each end, and having supply-tube B, the vertical parallel wick-tubes C, four or more, secured together by means of the cross-piece D, bail E pivoted at each end of the cylinder A, adjusting-wire G, handle H attached to vertical rod F, all arranged to operate as herein set forth for the purpose specified.

HENRY VAN AUSDALL.

Witnesses:
OREN BALDWIN.
WILSON BARRETT.